Dec. 1, 1931. J. F. STEVENSON 1,834,295
JACKING DEVICE FOR ROAD VEHICLES
Filed Jan. 23, 1930 3 Sheets-Sheet 1
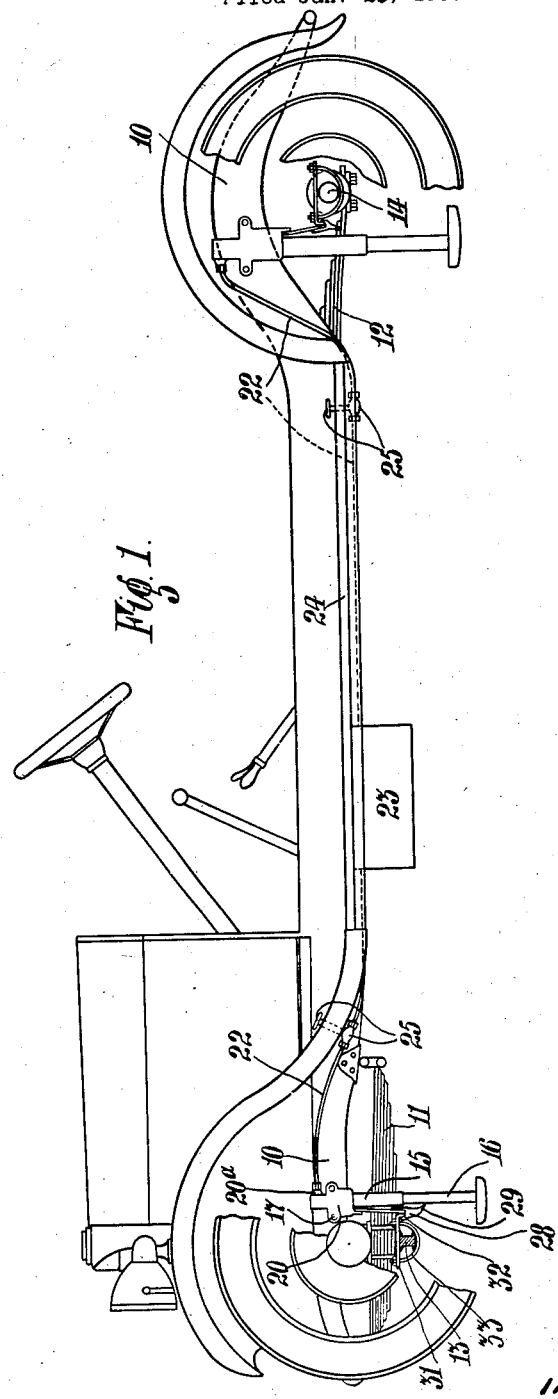
INVENTOR.
JOHN FERGUSON STEVENSON.
By Wiedersheim Fairbanks
ATTORNEYS.

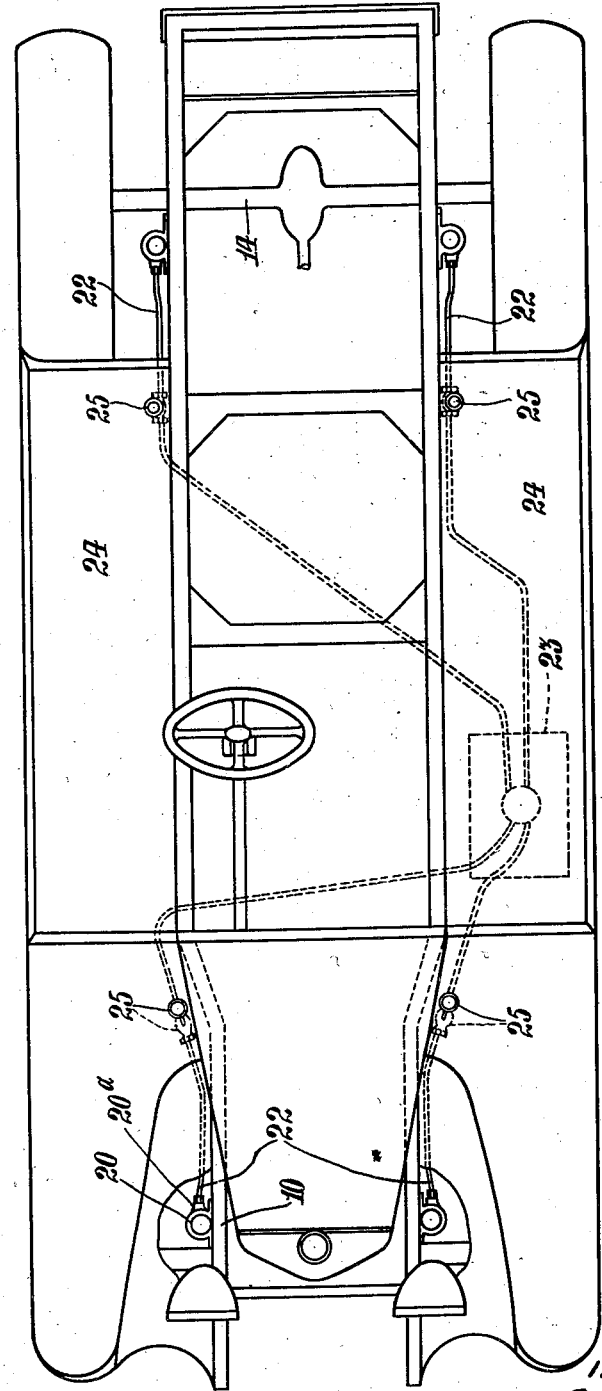

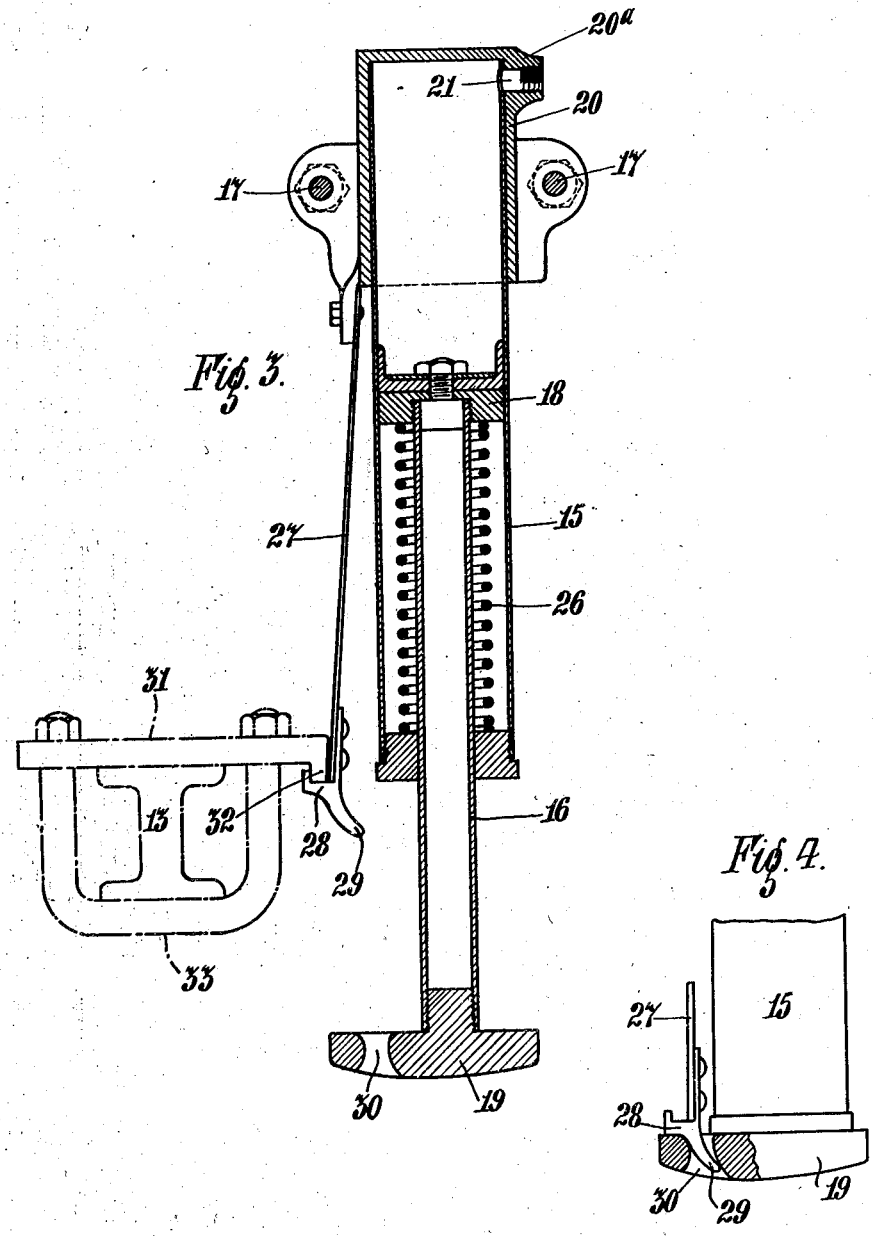

Patented Dec. 1, 1931

1,834,295

UNITED STATES PATENT OFFICE

JOHN FERGUSON STEVENSON, OF BELFAST, NORTHERN IRELAND

JACKING DEVICE FOR ROAD VEHICLES

Application filed January 23, 1930, Serial No. 422,738, and in Great Britain February 16, 1929.

This invention relates to jacking devices for road vehicles, such devices being of the type which are attached to or built into the vehicle, and the object of the invention is to provide devices of this type which will be more convenient and efficient to operate than heretofore.

According to this invention, a device of the above type is characterized by its main body (i. e. the non-moving part as distinguisded from the extending part thereof) being attached or adapted for attachment to a sprung portion of the vehicle, such as the chassis frame, and being combined with means for limiting the extent to which said sprung portion can be raised by the device before a determinate unsprung portion (e. g. the axle) of the vehicle is engaged by said limiting means and also raised. The said limiting means operate automatically during the operation of the jacking device.

The invention is applicable to jacks fitted adjacent to the road wheels of vehicles, jacks fitted to the approximate centre of the chassis side members, and jacks fitted to sprung portions at the approximate centre of the front or rear of vehicles.

The invention will now be described with reference to the accompanying drawings whereon:—

Fig. 1 is an elevation of an automobile chassis with parts thereof broken away;

Fig. 2 is a plan of Fig. 1;

Fig. 3 is a sectional view of a hydraulic jack drawn to a larger scale;

Fig. 4 is a fragmentary view showing certain parts in different positions from those in which they have been shown in Fig. 3.

With reference to the drawings, the chassis includes as usual side frames 10 which are each supported by springs 11 and 12 respectively attached to the front axle 13 and rear axle 14. Each side frame may thus be regarded as a sprung portion of the vehicle and each axle as an unsprung portion thereof.

Hydraulic jacks are provided on the side frames in the vicinity of both axles. Each jack comprises a body, or stationary part, 15 and an extending or movable part 16. The body 15, which is secured by bolts 17 to the respective frame 10, embodies a hydraulic cylinder wherein a piston 18 works. The extending portion 16 embodies a plunger to which the piston 18 is secured and which is fitted with a foot 19.

The head 20 of each hydraulic cylinder has a boss 20$^a$ through which passes a port 21 into the interior of the cylinder. The boss 20$^a$ is coupled to piping 22 leading from a pressure fluid tank 23 fastened below one of the usual running boards 24. As will be obvious, by appropriately turning any of the four valves indicated diagrammatically at 25 and located at suitable points in the piping 22 leading to the different cylinders, the respective jack can be operated, the piston 18 being forced downwards in the hydraulic cylinder by the pressure fluid in the usual manner. By turning the valve into a different position, the pressure fluid can be discharged from the cylinder, thereby allowing the piston 18 to return under the action of an internal spring 26.

The mode of controlling the supply of pressure fluid to the jacks forms no part of this invention and therefore is not described in detail, and any suitable mode may be adopted.

Each hydraulic cylinder head 20 is formed with a downwardly extending lug to which is secured the top end of a slat 27 made of spring steel. The lower end of each slat 27 is provided with a catch 28 formed with a curved extension or tail 29. The foot 19 is formed with a slot 30 which is shaped to receive the tail 29 and thereby lock the catch 28 in position when the jack is inoperative (see Fig. 4).

The axles 13 and 14 are securely fitted with suitable abutments immediately above the catches 28. These abutments may, as shown, each consist of a bar 31 having a downturned end 32 adapted to be engaged by the respective catch 28, the bar being bolted in position by a yoke 33 embracing the respective axle.

In the operation of any one of the jacks, the pressure fluid is first of all introduced into the hydraulic cylinder as aforesaid by turning the appropriate valve 25. As the piston 18 is lowered, the foot 19 moves clear of the tail 29, and allows the catch 28 to spring outwards into the operative position; i. e. the position in which it is vertically below the respective abutment 32. After the foot 19 reaches the ground, the hydraulic cylinder commences to rise and carries with it the respective side frame 10 (i. e. the sprung portion of the vehicle). The respective axle and wheel (i. e. the unsprung portion) remain stationary until the rising catch 28 engages with the abutment 32 (see Fig. 3), after which the sprung and unsprung portions are raised in unison.

It will thus be seen that, in the operation of any of the jacks, the thrust thereof will lift first the sprung portion and then both the sprung and unsprung portions, the relative movement between these portions being positively limited by the catch member comprising the parts 27, 28 and 29. It will also be seen that said catch member is rendered operative automatically during the operation of the jack.

When it is desired to lower the vehicle, the pressure fluid is allowed to discharge from the hydraulic cylinder of the jack concerned. Immediately after the wheel reaches the ground, the catch moves clear of the abutment. After the sprung portion reaches a position in which it is entirely spring-supported, the foot 19 rises off the ground and the tail 29 ultimately enters the slot 30, the catch member as a whole being thus locked in its inoperative position.

An advantage of the invention is that, since the bodies of the jacks are rigidly secured to the vehicle, the use of flexible tubing which is customary in vehicles equipped with hydraulic jacks, can be entirely dispensed with, the disadvantages of such use being thus avoided.

In some cases, the jack may be hinged for the purpose of increasing road clearance, when the jack is not in use and the turning of the hinged portion of the jack into its operative position may be used in a manner similar, or equivalent, to that hereinbefore described for bringing the limiting device into action.

In the case of a jack fitted to the approximate centre of the side frame of a motor vehicle, catch members corresponding to the catch member 27, may be provided in connection with each axle.

The invention hereinbefore described, may be applied to jacks operated hydraulically, mechanically, or in any other known manner. Where they are operated hydraulically, the pressure would be derived from the engine of the vehicle, and the fluid used may be either oil or water. Further, the individual jacks, instead of being controlled by separate valves as shown, would preferably be controlled by a single distributor located on the dashboard.

I claim:—

1. In a road vehicle including chassis side frames, axles, springs connecting said axles to said side frames, road-wheels on said axles, and abutments on said axles located in the vicinity of said road-wheels, the provision of jacking devices in the vicinity of said abutments, each of said devices comprising a cylinder secured to the respective side frame and adapted to lift the same when the device is operated, an extending member movable through said cylinder, a foot on said member, a spring-supported catch depending from said cylinder and adapted automatically to engage with the respective abutment so as to raise the respective axle during part of the operation of the device, and a locking recess in said foot for maintaining said catch in an inoperative position while the device is not in use.

2. In a road vehicle including an unsprung portion, an abutment thereon, and a relatively movable sprung portion, a jacking device adapted to be attached to, and to be operated so as to lift said sprung portion, a foot on said device, and automatic means on said device for limiting the relative movement of the sprung portion, said automatic means comprising a depending spring slat, a catch on said slat adapted to engage said abutment during part of the operation of the device, and a locking recess in said foot for maintaining said catch in an inoperative position while the device is not in use.

3. In a road vehicle including chassis side frames, axles, springs connecting said axles to said side frames, road-wheels on said axles, and abutments on said axles located in the vicinity of said road-wheels, the provision of jacking devices in the vicinity of said abutments, each of said devices comprising a pressure fluid cylinder secured to the respective side frame and adapted to lift the same when the device is operated, a plunger adapted to work in said cylinder, a foot on said plunger, a spring slat depending from said cylinder, a catch on said slat adapted automatically to engage with the respective abutment so as to raise the respective axle during part of the operation of the device, a tail on said catch, and a locking recess in said foot, said recess co-operating with said tail and maintaining said catch in an inoperative position while the device is not in use.

4. A road vehicle jacking device comprising a cylinder, means for attaching said cylinder to a sprung portion of the vehicle, a plunger working in said cylinder, a foot on said plunger, a spring slat depending from said cylinder, a catch on said slat for engagement with an unsprung portion of the vehicle, a tail on said catch, and a locking recess in said foot for maintaining said catch in an inoperative position while the device is not in use.

5. In a road vehicle including an unsprung portion and a relatively movable sprung portion, said unsprung portion having an abutment, a jacking device adapted for fitment to the vehicle in the vicinity of said abutment, and comprising a cylinder to be secured to said sprung portion so as to lift the same when the device is operated, an extending member movable through said cylinder, a foot on said member, a spring-influenced catch depending from said cylinder and adapted automatically to engage with the abutment so as to raise the unsprung portion during a period of the operation of the device, and a locking recess in said foot for maintaining said catch in an inoperative position while the device is not in use.

In testimony whereof I affix my signature.

JOHN FERGUSON STEVENSON.